United States Patent
Batni et al.

(10) Patent No.: US 8,385,514 B2
(45) Date of Patent: Feb. 26, 2013

(54) PROVIDING AN ADVERTISEMENT TO A CALLING PARTY BEFORE RINGBACK

(75) Inventors: Ramachendra P. Batni, Phoenix, AZ (US); Robert Brunetti, Munster, IN (US); Sanjoy Paul, Morganville, NJ (US); Michael J. Rudolph, Naperville, IL (US)

(73) Assignee: Alcatel Lucent, Paris (FR)

( * ) Notice: Subject to any disclaimer, the term of this patent is extended or adjusted under 35 U.S.C. 154(b) by 1184 days.

(21) Appl. No.: 11/561,769

(22) Filed: Nov. 20, 2006

(65) Prior Publication Data

US 2008/0120176 A1 May 22, 2008

(51) Int. Cl.
*H04M 1/64* (2006.01)

(52) U.S. Cl. ............ 379/76; 379/167.08; 379/263; 340/7.51; 705/14.4

(58) Field of Classification Search ........... 379/76, 379/207.02, 48, 72, 77, 167.08, 263, 88.22, 379/373.01; 705/14.13, 14.25, 14.4; 340/7.51
See application file for complete search history.

(56) References Cited

U.S. PATENT DOCUMENTS

| | | | |
|---|---|---|---|
| 6,070,147 A * | 5/2000 | Harms et al. ............. | 705/14.25 |
| 6,400,804 B1 * | 6/2002 | Bilder ...................... | 379/76 |
| 6,603,844 B1 | 8/2003 | Chavez, Jr. et al. | |
| 7,006,608 B2 | 2/2006 | Seelig et al. | |
| 7,136,470 B1 | 11/2006 | Taylor et al. | |
| 7,224,788 B1 | 5/2007 | Rhee | |
| 2002/0136377 A1 | 9/2002 | Stewart et al. | |
| 2003/0002657 A1* | 1/2003 | Seelig et al. ............. | 379/373.01 |
| 2006/0245571 A1 | 11/2006 | Radziewicz et al. | |
| 2006/0245574 A1 | 11/2006 | Phelps | |
| 2007/0116227 A1* | 5/2007 | Vitenson et al. ......... | 379/207.02 |
| 2008/0120176 A1 | 5/2008 | Batni et al. | |

FOREIGN PATENT DOCUMENTS

| | | |
|---|---|---|
| EP | 1157531 A | 11/2001 |
| JP | 09-172492 | 6/1997 |
| JP | 10271226 | 10/1998 |
| KR | 2000-12224 | 3/2000 |
| KR | 2005-69644 | 7/2005 |
| WO | WO 9300763 A2 | 1/1993 |

* cited by examiner

*Primary Examiner* — MD S Elahee
(74) *Attorney, Agent, or Firm* — Duft, Bornsen, Fishman, LLP (57) ABSTRACT

Communication networks and associated methods are disclosed that provide an advertisement or other type of informational message to a calling party before providing ringback tones. A communication network described herein receives a call from the calling party to the called party, and temporarily interrupts call processing for the call. The communication network then selects an advertisement for the call, and initiates delivery of the advertisement to the calling party. After the advertisement is delivered to the calling party, the communication network resumes call processing for the call. In resuming call processing, the communication network provides ringback tones to the calling party and attempts to connect the call to the called party.

20 Claims, 8 Drawing Sheets

PROVIDING AN ADVERTISEMENT TO A CALLING PARTY BEFORE RINGBACK

BACKGROUND OF THE INVENTION

1. Field of the Invention

The invention is related to the field of communication networks and, in particular, to providing an advertisement to a calling party before providing ringback for the call to the calling party.

2. Statement of the Problem

When a calling party places a call to a called party, the sounds heard by the calling party when waiting for the called party to answer the call is referred to as ringback tones. The communication network over which the call is placed provides the ringback tones to the calling party, which is typically a ringing sound. A present trend of service providers is to offer customized ringback tones to its subscribers. Customized ringback tones may comprise music, songs, sound clips, audio messages, prerecorded greetings, etc, that the communication network plays as ringback tones instead of or in addition to the traditional ringing sound. Customized ringback tones may be associated with specific directory numbers of the calling party, such as with phone lists or exclusion lists. The subscriber can also set conditions for when, for whom, or what is played for the ringback tones based on time, day of the week, the calling party, etc. Customized ringback tones have generated high revenues for services providers.

Emerging multimedia phones (e.g., wireless handsets, broadband wireline phone sets, SIP phones, etc) allow text, animated images, audio/video clips, etc, as multimedia ringback tones to the calling party. The subscriber can define selected images or video clips as multimedia ringback tones and store them in the communication network. If a calling party calls the subscriber, the communication network plays back the selected image or video clip to the calling party based on the multimedia ringback tone profile defined by the subscriber.

A source of revenue generation for service providers is selling advertising targeted to its subscribers. One problem facing service providers is thus how to provide the advertising to the subscribers. One solution is to replace the traditional ringback for a call with a multimedia ringback tone that is an advertisement. Instead of a calling party hearing the traditional ringing sound when calling a business or an individual, the communication network may play a multimedia advertisement to the calling party. Although using the multimedia ringback tone as the advertisement is useful, there may be some limitations. For instance, the advertisement may not be fully played to the calling party if the called party answers the call before the advertisement has been fully played. Thus, it may be desirable to provide advertisements to a calling party in a different manner.

SUMMARY OF THE SOLUTION

The invention provides advantages over prior communication networks and methods by providing an advertisement to a calling party before providing ringback tones for the call. In one embodiment of the invention, the communication network receives a call from the calling party to the called party, and temporarily interrupts call processing for the call. The communication network then selects an advertisement for the call, and initiates delivery of the advertisement to the calling party. After the advertisement has been delivered to the calling party, the communication network resumes call processing for the call. In resuming call processing, the communication network provides ringback tones to the calling party and attempts to connect the call to the called party.

Because call processing is temporarily interrupted, the communication network can provide the advertisement to the calling party in full. After the advertisement is delivered and call processing resumes, the ringback tones are provided to the calling party as the call is being set up. The advertisement is not interrupted by the called party answering the call, because call processing is temporarily interrupted and has not yet been extended to the called party. Temporarily interrupting call processing advantageously allows a service provider to ensure that complete advertisements are provided to calling parties.

Another embodiment of the invention is a communication network comprising an advertising system and a network node. The network node is adapted to receive a call from a calling party to a called party, and to interrupt call processing for the call. The network node is further adapted to transmit a message to the advertising system requesting an advertisement for the call. The advertising system is adapted to select an advertisement for the call, and to initiate delivery of the selected advertisement to the calling party. After the selected advertisement is delivered to the calling party, the network node is further adapted to resume call processing to allow the calling party to receive ringback tones for the call.

The invention may include other exemplary embodiments described below.

DESCRIPTION OF THE DRAWINGS

The same reference number represents the same element or same type of element on all drawings.

DETAILED DESCRIPTION OF THE INVENTION

FIGS. 1-8 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention.

Those skilled in the art will appreciate that the features described below can be combined in various ways to form multiple variations of the invention. As a result, the invention is not limited to the specific embodiments described below, but only by the claims and their equivalents.

Figure 1:
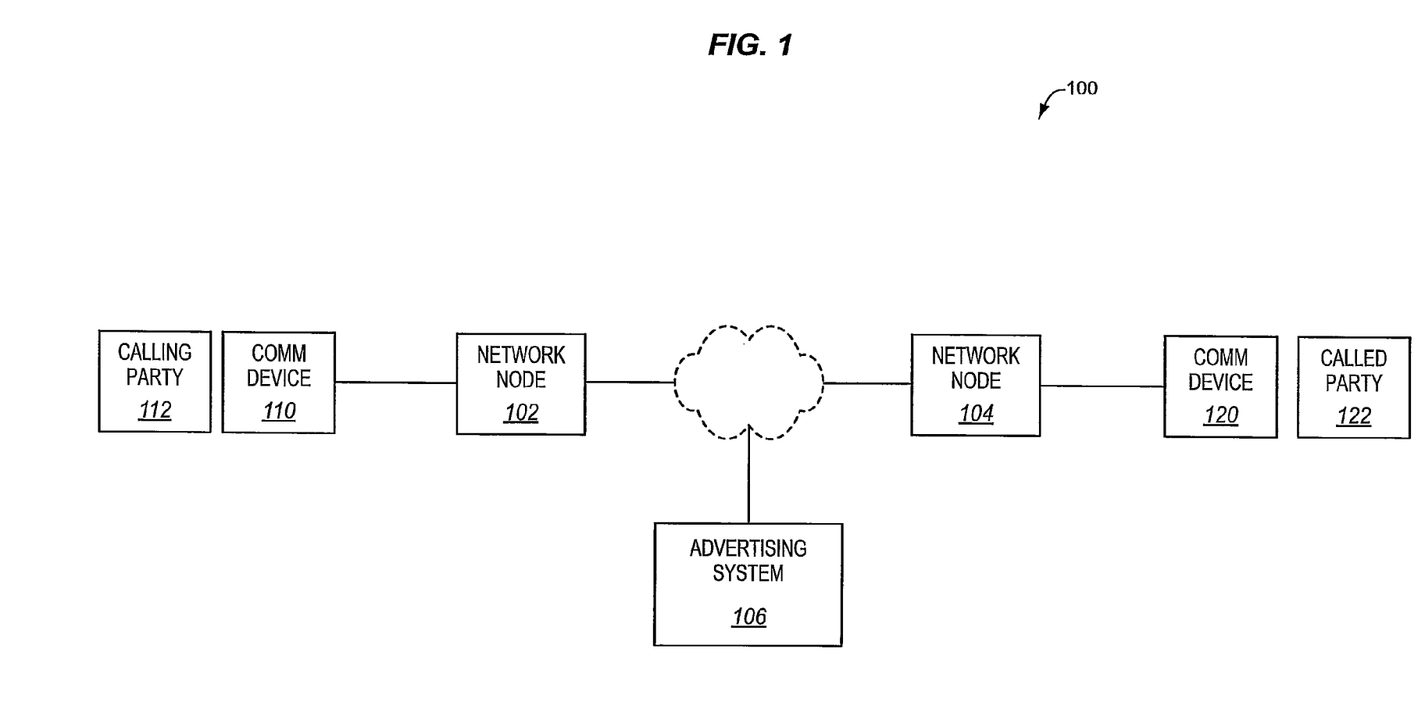
FIG. 1 illustrates a communication network in an exemplary embodiment of the invention.

FIG. 1 illustrates a communication network 100 in an exemplary embodiment of the invention. Communication network 100 may comprise a wireline network, such as a PSTN, or a wireless network, such as a Code Division Multiple Access (CDMA) network, a Time Division Multiple Access (TDMA) network, a Global System for Mobile Communication (GSM) network, or a Universal Mobile Telecommunications System (UMTS) network. Communication network 100 may include a circuit-based core network, or a packet-based core network, such as an IP Multimedia Subsystem (IMS) network. Communication network 100 is adapted to provide communications between calling party 112 (through communication device 110) and called party 122 (through communication device 120). Devices 110 and 120 comprise any communication devices, such as a wireline phone, a wireless (mobile) phone, a PDA, a VoIP phone, a SIP-based phone, etc.

Communication network 100 includes a network node 102, a network node 104, and an advertising system 106. Network node 102 includes any switch, server, or other device that serves device 110 for a call. For instance, network node 102 may comprise a switch in a wireline network, a Mobile Switching Center (MSC) in a wireless network, or a Call Session Control Function (CSCF) in an IMS network. Similarly, network node 104 includes any switch, server, or other device that serves device 120 for a call.

Advertising system 106 comprises any system, server, or device adapted to play, deliver, or otherwise provide an advertisement to calling party 112. An advertisement comprises any media or content adapted to draw attention to goods and/or services. The goods or services may be related to communication network 100 (or the service provider operating the communication network 100) or may be related to a third party that contracts with the service provider to provide the advertisement. The advertisement may be delivered to calling party 112 according to many different media types, such as text, audio, video, multimedia, etc. Advertising system 106 may also provide other types of informational messages that are not necessarily advertisements. For instance, the informational messages may be an announcement of an anniversary, an announcement of a party, an emergency message such as a weather alert or a traffic alert, etc.

Advertising system 106 may comprise a single, independent server or system in communication network 100, such as an Intelligent Peripheral (IP) or an Application Server (AS), or may be distributed among multiple servers or systems in communication network 100. Advertising system 106 may also be incorporated in network node 102 and/or network node 104. Advertising system 106 stores information on advertisements that are to be delivered to calling party 112 and other calling parties. The information on the advertisements may include actual content for the advertisements, such as audio files, video files, etc. The information on the advertisements may also or alternatively include identification information for the advertisements, such as a title of an advertisement, an owner of an advertisement, or a location of an advertisement (e.g., a link, a network address, etc). Advertising system 106 may not necessarily store each of the actual advertisements, but should include information on the advertisements to be used in communication network 100.

Communication network 100 is operated by a service provider or multiple service providers. The service provider in this embodiment is offering an advertising service that provides one or more advertisements during a call before the ringback tones are provided for the call. Calling party 112 and/or called party 122 may be subscribing to the advertising service in this embodiment.

Figure 2:
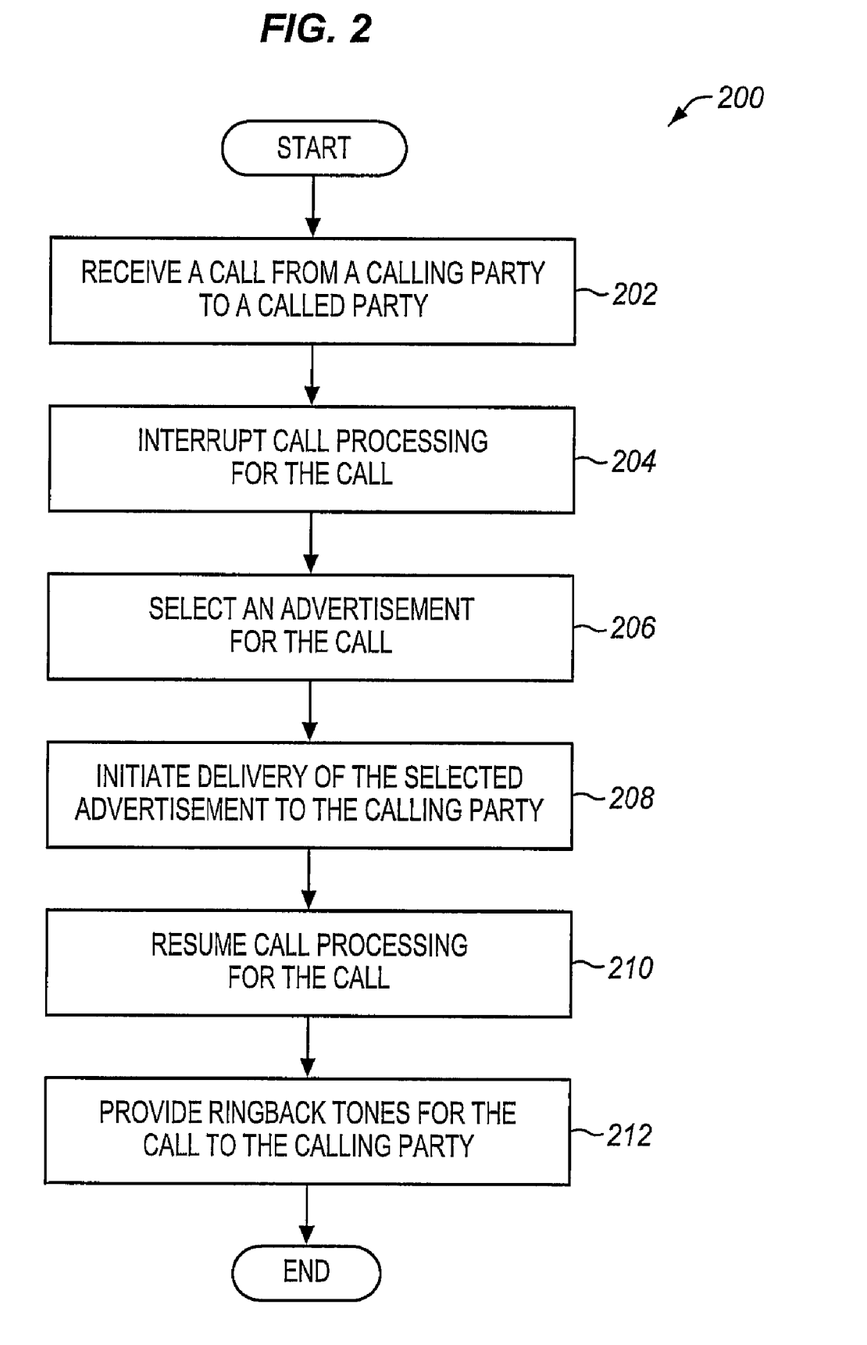
FIG. 2 is a flow chart illustrating a method of operating a communication network to provide an advertisement to a calling party in an exemplary embodiment of the invention.

FIG. 2 is a flow chart illustrating a method 200 of operating communication network 100 to provide an advertisement to calling party 112 in an exemplary embodiment of the invention. The steps of method 200 will be described with reference to communication network 100 in FIG. 1. The steps of the flow chart in FIG. 2 are not all inclusive and may include other steps not shown.

In step 202 of method 200, network node 102 receives a call from calling party 112 to called party 122 through device 110. In receiving the call, network node 102 may receive dialed digits for the call. Network node 102 initiates call processing to determine how to proceed with the call. As part of call processing, there may be one or more triggers defined to provide the advertising service described herein. If the condition or conditions for a trigger are satisfied during call processing, then network node 102 temporarily interrupts call processing for the call in step 204. Network node 102 also transmits a message to advertising system 106 requesting an advertisement for the call.

Advertising system 106 receives the message from network node 102, and selects an advertisement for the call in step 206. Advertising system 106 may select the advertisement based on information on calling party 112, information on called party 122, or other information. For instance, advertising system 106 may select the advertisement based on a user profile (e.g., age, hobbies, etc) for calling party 112, based on a location of calling party 112, or based on other information on calling party 112. Advertising system 106 may select the advertisement based on an identity of called party 122, based on a user profile for called party 122, or based on other information on called party 122. Advertising system 106 may also select no advertisement to play for the call, which means that advertising system 106 is slipping the advertisement for a call.

Advertising system 106 then initiates delivery of the selected advertisement to calling party 112 in step 208. The advertisement may comprise any type of media content, such as text, audio, video, multimedia, etc. Advertising system 106 may initiate delivery of the advertisement in a variety of ways. For instance, advertising system 106 may store the content for the selected advertisement, and may deliver the advertisement to calling party 112 through network node 102. Alternatively, advertising system 106 may identify another content server that stores the selected advertisement, and may provide network node 102 with a network identifier (e.g., URL or TLDN) for the content server. Network node 102 may then contact the content server, and the content server delivers the advertisement to calling party 112. Alternatively, advertising system 106 may transmit a network identifier to device 110 indicating the content server that is storing the advertisement. Device 110 may then automatically access the content server to download the advertisement responsive to receiving the network identifier.

After the advertisement is delivered to calling party 112, network node 102 resumes call processing for the call. A normal call flow may now take place to attempt to connect the call to called party 122. In FIG. 1, network node 102 routes the call to network node 104. Network node 104 then attempts to connect the call to device 120. Network node 104 also provides ringback tones (otherwise referred to as progress tones) to device 110 of calling party 112 in step 212. The ringback tones may be traditional ringing tones, multimedia ringback tones, another advertisement, or any other type of ringback. Network node 104 may contact a ringback tone server (not shown in FIG. 1) to provide the ringback tones to device 110. The ringback tones may comprise on-hook ringback tones or busy ringback tones depending on the status of called party 122 (on-hook or busy).

If calling party 112 listens to or views an advertisement, then advertisement system 106 may credit awards points earned by calling party 112 for receiving the advertisement. Advertising system 106 may maintain an account for calling party 112 that is used to track award points earned by calling party 112. The award points may be redeemed by calling party 112 for discounts, gift purchases, etc.

In an alternative embodiment, network node 104 may perform some or all of the functions performed by network node 102. For instance, network node 104 may monitor one or more triggers, and if a trigger is encountered, interrupt call processing and contact advertising system 106. If calling party 112 is a subscriber to the advertising service, then network node 102 that is serving device 110 of calling party 112 will probably provide the operation described for method 200. If called party 122 is a subscriber to the advertising service, then network node 104 that is serving device 120 of called party 122 will probably provide the operation described for method 200 instead of network node 102. The service provider may configure communication network 100 in different desired ways.

Method 200 described above provides advantages over prior advertising services. Because call processing is temporarily interrupted, advertising system 106 can provide the advertisement to calling party 112 in full. After the advertisement is delivered and call processing resumes, the ringback tones are provided to calling party 112 as the call is being set up. The advertisement is not interrupted by called party 122 answering the call, because the call processing is temporarily interrupted and has not yet been extended to called party 122. Temporarily interrupting the call processing advantageously allows a service provider to ensure that a complete advertisement is provided to calling party 112.

As stated in the preceding paragraphs, advertising system 106 may select an advertisement to play for the call based on different criteria. One exemplary criterion used to select an advertisement may be a user profile for calling party 112. A user profile comprises any data or information for calling party 112 that is used to select an advertisement. The user profile may include the age of calling party 112, the gender of calling party 112, services subscribed to by calling party 112, capabilities of device 110, bandwidth available to device 110, quality of service levels, particular interests of calling party 112 (such as a sports enthusiast, a comedy enthusiast, a music enthusiast, etc), or any other desired information. Advertising system 106 may process the user profile to select the advertisement to play for calling party 112.

Another exemplary criterion used to select an advertisement may be a selection by calling party 112. One assumption for this criterion is that calling party 112 has subscribed to the advertising service. When signing up for the advertising service, calling party 112 may select one or more types or categories of advertisements to play. For instance, one category of advertisement may be "restaurants" and another category of advertisement may be "movies". Calling party 112 may thus define what categories of advertisements are played. Calling party 112 may also change his/her selection of the categories of advertisements, such as through a web page, through device 110 (such as through a drop down menu), etc. Calling party 112 may also select a more specific category of advertisement, such as advertisements for iPODs, watches, etc.

Another exemplary criterion used to select an advertisement may be a present status of calling party 112. Some exemplary status of calling party 112 are "home", "office", "driving", "out of town", etc. Calling party 112 may define what categories of advertisements are played for each status of calling party 112. If the status of calling party 112 changes, then the advertisements selected by advertising system 106 may also change.

Advertising system 106 may also allow for calling party 112, the service provider operating communication network 100, or another entity to define advertising characteristics. Advertising characteristics are rules or policies used to control how advertisements are provided to a calling party. For instance, one advertising characteristic may be the maximum number of advertisements allowed during a certain time frame. Another advertising characteristic may be the maximum number of advertisements allowed from a particular vendor. Another advertising characteristic may be the number of times the same advertisement will be presented to a calling party. Advertising system 106 may maintain a history of advertisements that are played out to individual parties, and process the advertising characteristics and the history to further assist in selecting an advertisement to play.

Another exemplary criterion used to select an advertisement may be the location of calling party 112. Advertising system 106 may then provide a location-based advertisement to calling party 112. For instance, if calling party 112 is located in a shopping mall, then advertising system 106 may play an advertisement for a sale at a store in the vicinity of calling party 112. To provide location-based advertisements, advertising system 106 acquires the location (or estimated location) of calling party 112. In one example, advertising system 106 may receive a latitude/longitude from device 110 of calling party 112 if device 110 is GPS enabled. In another example, advertising system 106 may receive an MSCID from the MSC that is serving device 110 if calling party 112 is a mobile user. Advertising system 106 may then access a database that maps the MSCID to a location in order to estimate the location of calling party 112. In another example, advertising system 106 may receive a directory number of calling party 112 if calling party 112 is a wireline (fixed-location) user. Advertising system 106 may then access a database that maps the NPA-NXX of the directory number to a location in order to estimate the location of calling party 112.

Calling party 112 may have the option of selecting whether the advertisements should relate to his/her home location or present location (e.g., roaming situation). An exemplary implementation of this concept is as follows. The user profile for calling party 112 includes a provisionable "Home or Current Location" flag that is associated with each category of advertisement. The flag indicates to advertising system 106 whether to provide calling party 112 with advertisements based on his/her home location or present location for each category. As an example, assume that calling party 112 selects the "home location" for a category of advertisements "cars". Further assume that calling party 112 selects the "present location" for a category of advertisements "food". When selecting an advertisement to provide to calling party 112, advertising system 106 checks the "Home or Current Location" flag to determine which location to use. As an example, if the category of advertisements selected is "cars", then advertising system 106 will select car advertisements related to the home location of calling party 112. If the category of advertisements selected is "food", then advertising system 106 will select food advertisements related to the present location of calling party 112, no matter whether calling party 112 is registered at home or is roaming.

While the advertisement is being played to calling party 112 in any of the above embodiments, calling party 112 may interact with communication network 100 to invoke one or more features, such as by using feature codes, voice commands, etc. In one example, calling party 112 may provide input requesting that the present advertisement be skipped, such as by entering a particular feature code (e.g., *96) or by saying the word "skip". Responsive to receiving the input, advertising system 106 will skip the advertisement or stop playing the advertisement, and direct network node 102 to resume call processing. In another example, calling party 112 may provide input requesting additional information on the advertisement being played by entering a particular feature code (e.g., *97) or by saying the word "more". Responsive to receiving the input, advertising system 106 may transmit a text/multimedia message, an email message, or another type of message to calling party 112 that includes the additional information requested by calling party 112.

If calling party 112 skips the advertisement as described in the preceding paragraph, then advertising system 106 may adjust any reward points that were already credited to calling party 112. For instance, when initiating delivery of the advertisement to calling party 112, advertising system 106 may credit the award points to an account for calling party 112. If calling party 112 later provides input to skip the advertisement, then advertising system 106 may debit the previously credited reward points from the account for calling party 112.

Figure 3:
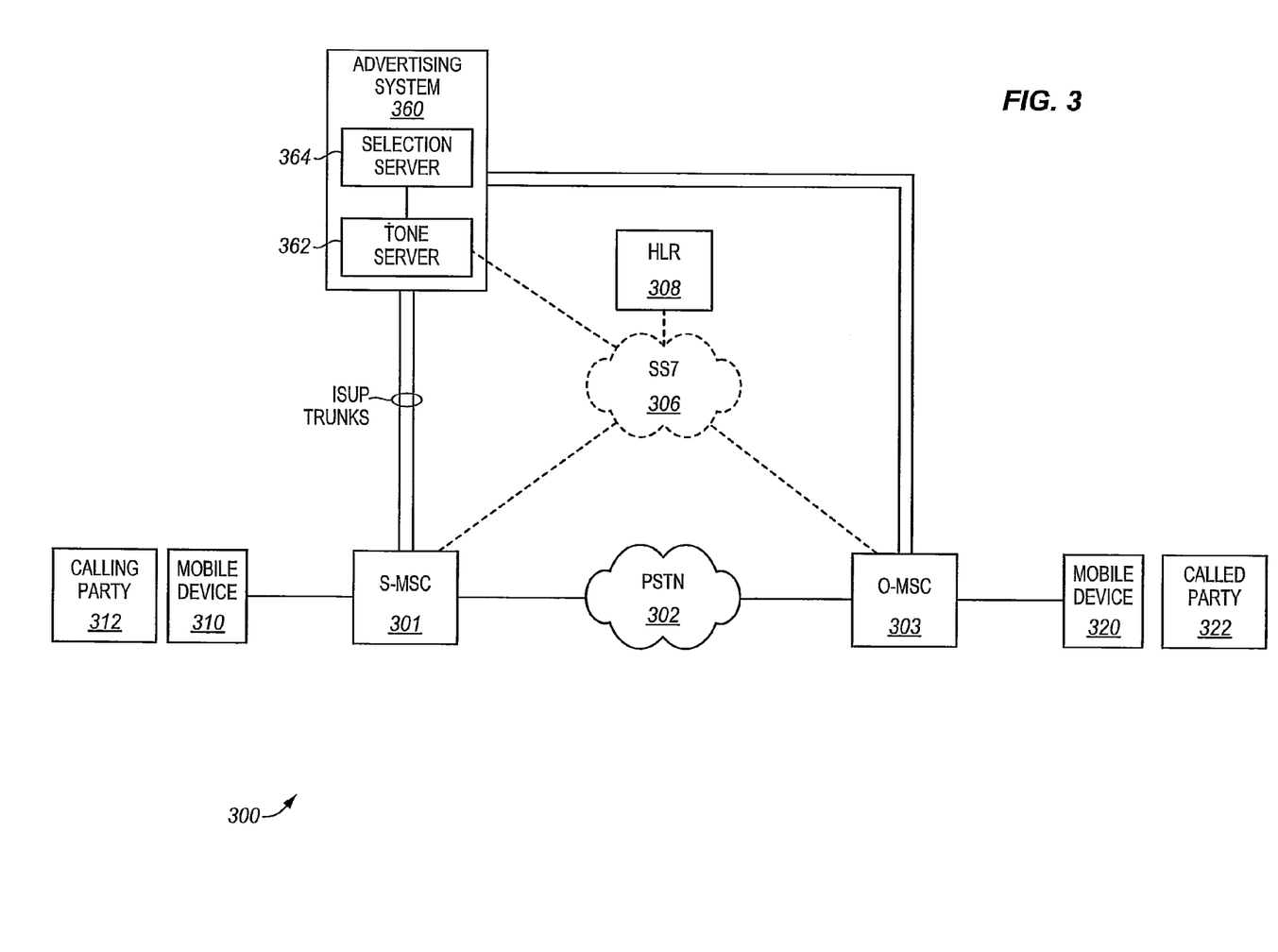
FIG. 3 illustrates another communication network in an exemplary embodiment of the invention.

FIG. 3 illustrates another communication network 300 in an exemplary embodiment of the invention. Communication network 300 comprises a wireless network in this embodiment that includes Wireless Intelligent Network (WIN) functionalities. Communication network 300 is adapted to provide communications between calling party 312 (through mobile device 310) and called party 322 (through mobile device 320). Communication network 300 includes a Mobile Switching Center (MSC) 301 that serves mobile device 310 of calling party 312. MSC 301 is referred to as the serving-MSC (S-MSC). Communication network 300 also includes MSC 303 that serves mobile device 320 of called party 322. MSC 303 is referred to as the originating MSC (O-MSC). S-MSC 301 and O-MSC 303 are each connected to a circuit-switched bearer network referred to herein as PSTN 302. S-MSC 301 and O-MSC 303 are also each connected to a signaling network referred to herein as the SS7 network 306. The bearer network and signaling network (the core network) may comprise a packet network in other embodiments, such as an IMS network. Communication network 300 also includes an HLR 308 that stores a user profile for calling party 312 or for called party 322. Communication network 300 may include other networks, systems, or devices not shown in FIG. 3, such as a base station between S-MSC 301 and mobile device 310, and a base station between O-MSC 303 and mobile device 320.

Communication network 300 also includes an advertising system 360. Advertising system 360 includes a tone server 362 and a selection server 364. Tone server 362 comprises any system or server that handles network operations for advertising system 360. Selection server 364 comprises any system or server that selects an advertisement to play to a calling party 312.

For the following description, assume that calling party 312 has subscribed to an advertising service provided by the service provider operating communication network 300. The advertising service is a service that provides advertisements to a calling party before providing ringback for the call.

Figure 4:
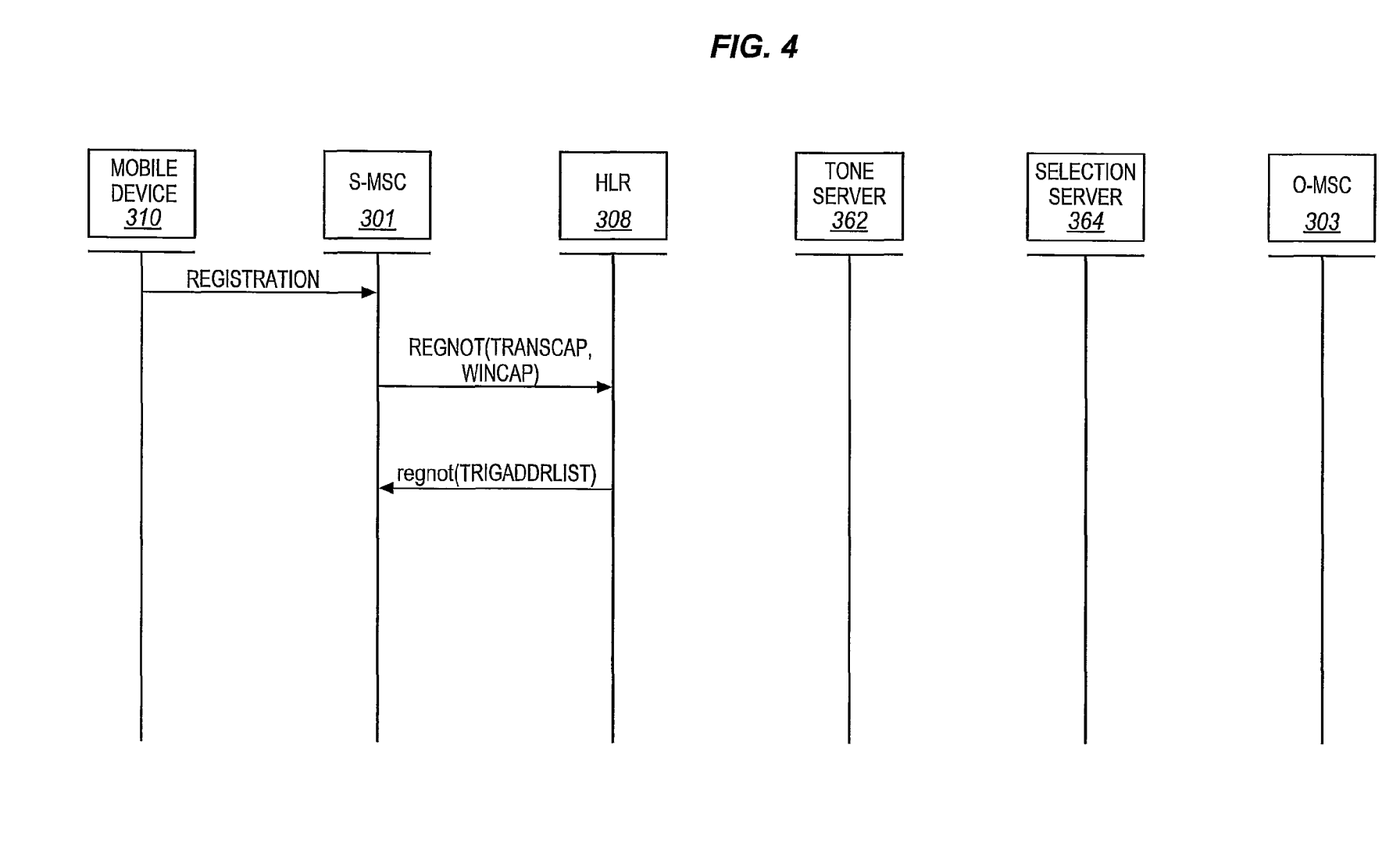
FIG. 4 is a message diagram illustrating an exemplary operation of the communication network of FIG. 3 to register a calling party in an exemplary embodiment of the invention.

FIG. 4 is a message diagram illustrating an exemplary operation of communication network 300 to register a calling party in an exemplary embodiment of the invention. To start, assume that mobile device 310 of calling party 312 turns on or moves into range of S-MSC 301. Mobile device 310 transmits a registration message to S-MSC 301. Responsive to receiving the registration message, S-MSC 301 transmits an ANSI-41 Registration Notification (REGNOT) message to HLR 308 (which is the HLR for calling party 312 in this embodiment) requesting profile information for calling party 312. The REGNOT message may include a location for mobile device 310, a TRANSCAP parameter, and a WINCAP parameter. The TRANSCAP parameter is set to indicate that S-MSC 301 can process a TRIGADDRLIST parameter. The WINCAP parameter is set to indicate the WIN capabilities of S-MSC 301.

Responsive to receiving the REGNOT message, HLR 308 transmits a response message to S-MSC 301 in the form of a regnot message. The regnot message includes the TRIGADDRLIST parameter, which is set to indicate which of the WIN triggers are active. For instance, the TRIGADDRLIST parameter may indicate that the All_Calls trigger is active. The TRIGADDRLIST parameter also specifies routing to the network entity that should be contacted responsive to a triggering event. In this embodiment, the network entity that should be contacted is tone server 362, so the TRIGADDRLIST parameter includes a network identifier or a network address for tone server 362. Mobile device 310 is now registered with the advertising service offered by the service provider.

Figure 5:
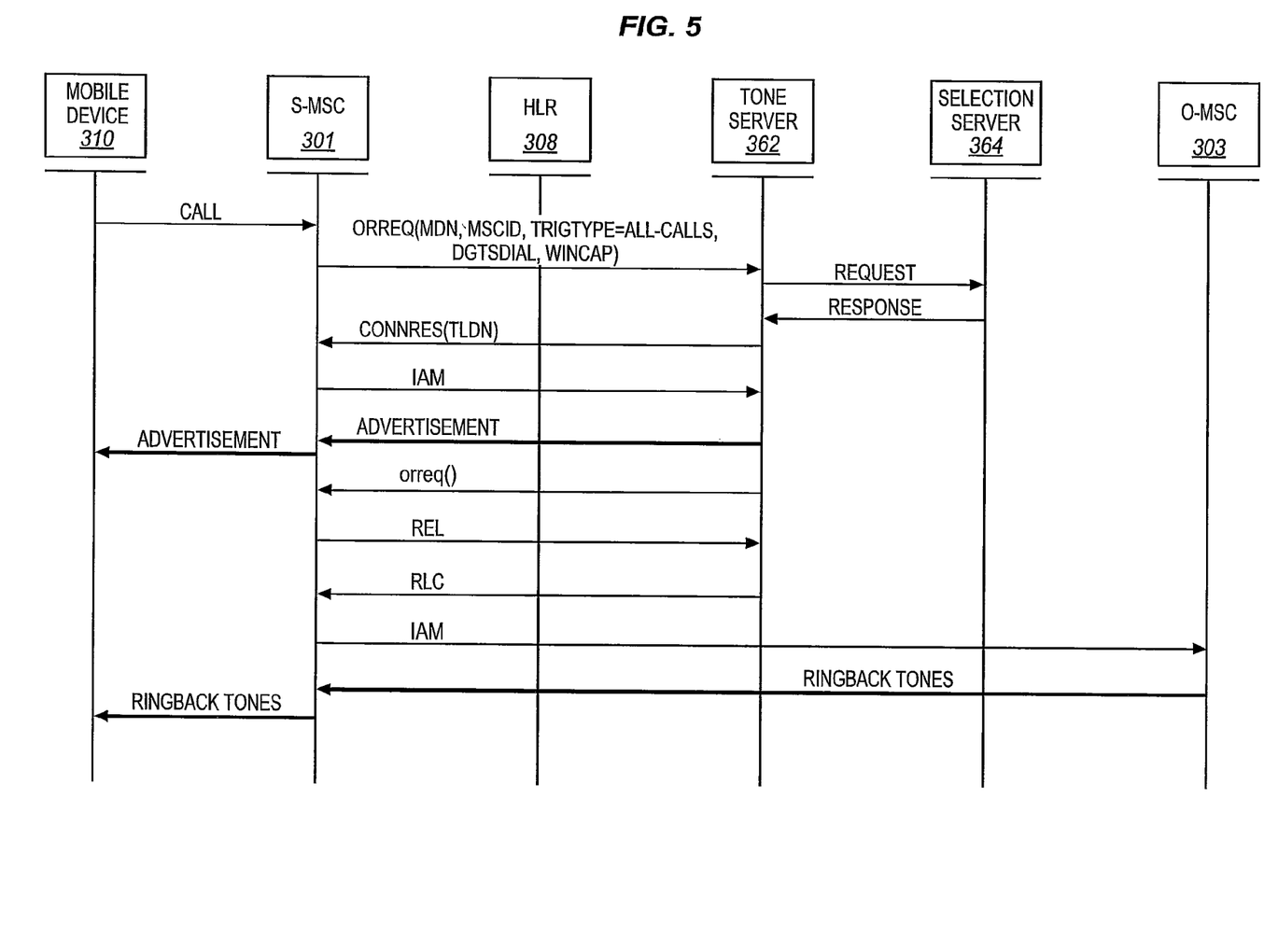
FIG. 5 is a message diagram illustrating an exemplary operation of the communication network of FIG. 3 to provide an advertisement to a calling party in an exemplary embodiment of the invention.

FIG. 5 is a message diagram illustrating an exemplary operation of communication network 300 to provide an advertisement to calling party 312 in an exemplary embodiment of the invention. In this embodiment, the network node serving the calling party is the trigger for the advertising service. When the network node serving the calling party is the trigger, a calling party will hear an advertisement each time he/she places a call (unless the advertisement is skipped).

When in operation, calling party 312 places a call through mobile device 310. S-MSC 301 receives the dialed digits for the call and initiates processing of the call. In processing the call, if S-MSC 301 encounters an active trigger (e.g., All_Calls trigger), then S-MSC 301 transmits an origination request (ORREQ) message to tone server 362. The ORREQ message includes call related parameters, such as the calling party directory number (MDN), the dialed digits (DGTSDIAL) for the call, the MSCID for S-MSC 301, and trigger type and WIN capabilities. Responsive to encountering the active trigger, S-MSC 301 also suspends call processing on the call and waits for an orreq response message from tone server 362 to proceed further with the call processing.

Tone server 362 receives the ORREQ message from S-MSC 301, and invokes the advertising service using the parameters received in the ORREQ message. Because calling party 312 has been provisioned in tone server 362 for the advertising service, tone server 362 transmits a request message to selection server 364 requesting details of the advertisement to play for the call (if any). Tone server 362 includes the calling party directory number, MSCID, called party directory number, and other available information in the request message to selection server 364.

Selection server 364 applies its logic to the user profile for calling party 312 to determine whether or not to play an advertisement for the call. If a decision is made to play an advertisement, then selection server 364 also selects an advertisement to play. Selection server 364 may select the advertisement based on different criteria, some of which were described in previous embodiments. After selecting the advertisement to play, selection server 364 transmits a response message to tone server 362. The response message includes an identifier for the selected advertisement.

Responsive to receiving the advertisement identifier, tone server 362 transmits a Connect Resource (CONNRES) message to S-MSC 301. A TLDN parameter of the CONNRES message includes a directory number for tone server 362. Responsive to receiving the CONNRES message, S-MSC 301 transmits an ISUP Initial Address Message (IAM) to tone server 362 to establish a (temporary) call leg to the directory number indicated in the TLDN parameter of the CONNRES message. S-MSC 301 thus establishes a temporary call leg to tone server 362 based on the directory number.

With the call leg established, tone server 362 plays or delivers the selected advertisement to mobile device 310 over the bearer channel that has been set up. Tone server 362 also monitors the bearer channel for any inputs from calling party 312 and takes appropriate actions. One such action may be skipping the advertisement. Another action may be requesting additional information regarding the advertisement.

Upon completion of the advertisement, tone server 362 transmits an orreq message with Null parameters to S-MSC 301. Responsive to the orreq message, S-MSC 301 transmits a Release (REL) message to tone server 362 to tear down the (temporary) call leg. Tone server 362 responds with an ISUP Release Complete (RLC) message. S-MSC 301 then resumes processing the call to called party 322 by transmitting an IAM for the call to O-MSC 303. Responsive to the IAM, O-MSC 303 attempts to connect the call to mobile device 320. O-MSC 303 also transmits ringback tones to mobile device 310 through S-MSC 301. The ringback tones may be traditional ringing tones, multimedia ringback tones, another advertisement, or any other type of ringback.

Figure 6:
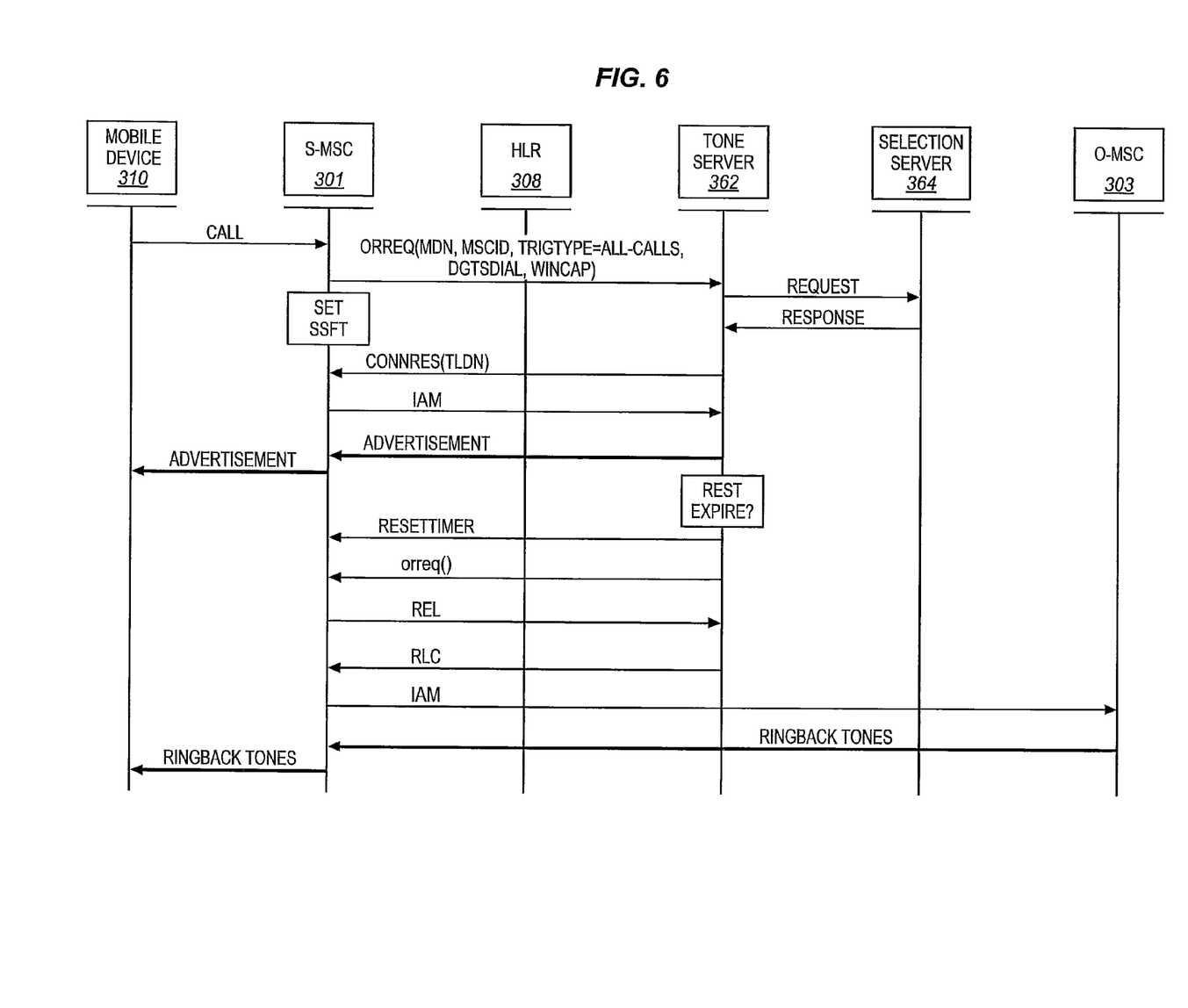
FIG. 6 is a message diagram illustrating another exemplary operation of the communication network of FIG. 3 to provide an advertisement to a calling party in an exemplary embodiment of the invention.

FIG. 6 is a message diagram illustrating another exemplary operation of communication network 300 to provide an advertisement to calling party 312 in an exemplary embodiment of the invention. Like FIG. 5, S-MSC 301 in FIG. 6 receives dialed digits for a call and initiates processing of the call from mobile device 310 of calling party 312. In processing the call, if S-MSC 301 encounters an active trigger, then S-MSC 301 transmits an ORREQ message to tone server 362. Responsive to encountering the active trigger, S-MSC 301 suspends call processing on the call and waits for an orreq response from tone server 362 to proceed further with the call processing. S-MSC 301 also sets a Service Switching Function Timer (SSFT) responsive to interrupting call processing. The SSFT assures that there is a limit to how long call processing is interrupted, and may be generally referred to as an interrupt timer.

FIG. 6 then proceeds as in FIG. 5 until tone server 362 plays the advertisement to mobile device 310. In addition to playing the advertisement, tone server 362 starts a Reset Timer (REST) to expire before the SSFT expires in S-MSC 301. Because the advertisement may play for five seconds, ten seconds, fifteen seconds, etc, the advertisement may play longer than the SSFT. Thus, if the REST in the tone server 362 expires, then tone server 362 transmits ResetTimer message (RESTTIMER) to S-MSC 301. Responsive to receiving the ResetTimer message, S-MSC 301 re-initializes the SSFT. Tone server 362 then again sets the REST and continues to transmit ResetTimer messages to S-MSC 301 if the REST expires. The rest of the flow at the termination of the advertisement follows the description provided in FIG. 5.

Figure 7:
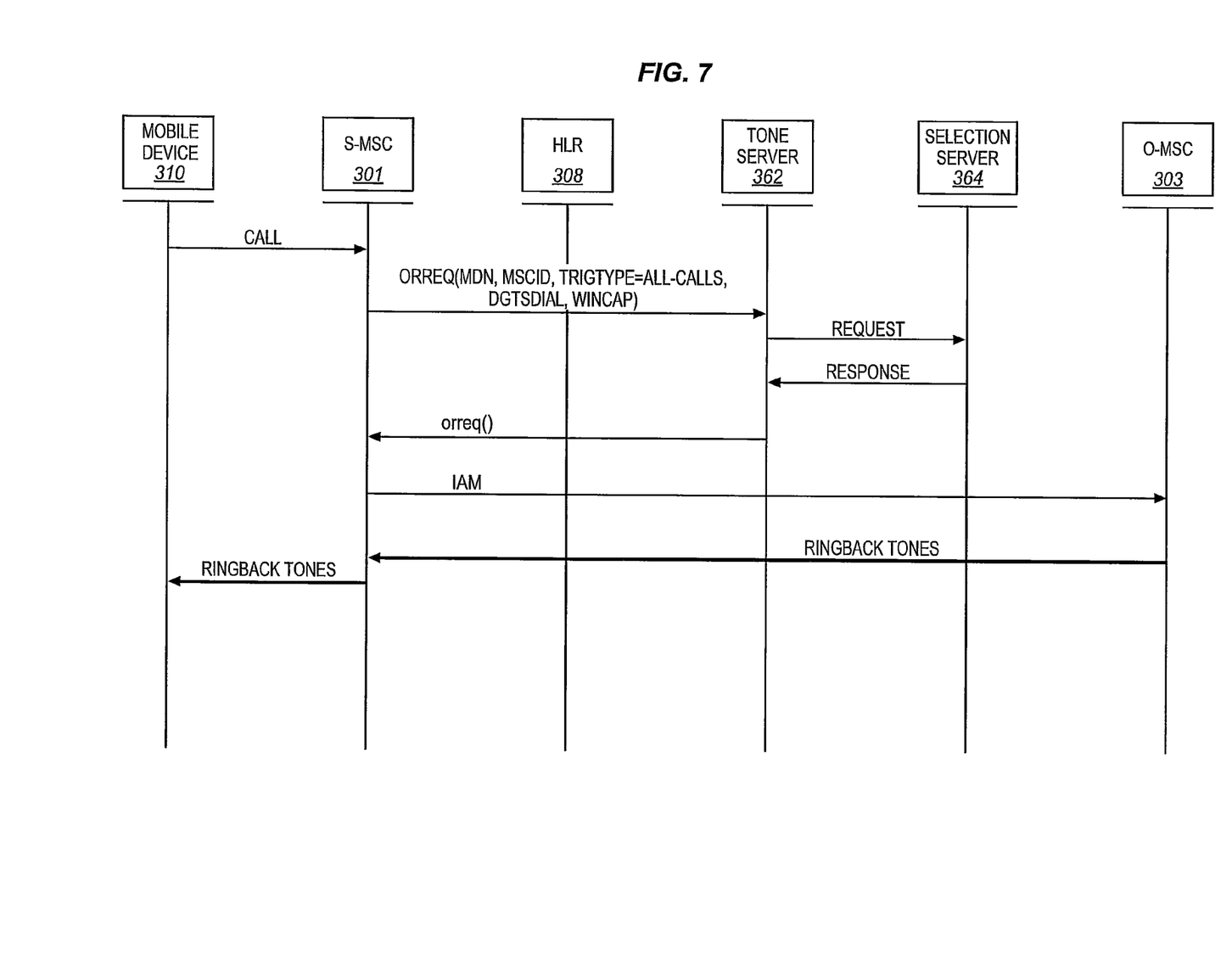
FIG. 7 is a message diagram illustrating an exemplary operation of the communication network of FIG. 3 to skip an advertisement in an exemplary embodiment of the invention.

FIG. 7 is a message diagram illustrating an exemplary operation of communication network 300 to skip an advertisement in an exemplary embodiment of the invention. Calling party 312 places a call through mobile device 310. S-MSC 301 receives the dialed digits for the call and initiates processing of the call. In processing the call, if S-MSC 301 encounters an active trigger (e.g., All_Calls trigger), then S-MSC 301 transmits an ORREQ message to tone server 362. Responsive to encountering the active trigger, S-MSC 301 also suspends call processing on the call and waits for an orreq response from tone server 362 to proceed further with the call processing.

Tone server 362 receives the ORREQ message from S-MSC 301, and invokes the advertising service using the parameters received in the ORREQ message. Because calling party 312 has been provisioned in tone server 362 for the advertising service, tone server 362 transmits a request message to selection server 364 requesting details of the advertisement to play for the call (if any). Selection server 364 may maintain a list of dialed digits for which the advertisement will be skipped for calling party 312. For instance, calling party 312 may not want to receive advertisements for calls home, for calls to a child's cell phone, etc. Selection server 364 may also or alternatively process other criteria to determine whether or not to play an advertisement for the call. In this embodiment, selection server 364 determines that an advertisement is not to be played for this call, and transmits a response message to tone server 362 indicating that no advertisement is to be played.

Responsive to receiving the response message, tone server 362 transmits an orreq message with Null parameters to S-MSC 301. Responsive to the orreq message, S-MSC 301 resumes processing the call to called party 322 by transmitting an IAM for the call to O-MSC 303. Responsive to the IAM, O-MSC 303 attempts to connect the call to mobile device 320. O-MSC 303 also transmits ringback tones to mobile device 310 through S-MSC 301. Any request/response messaging scheme using a suitable protocol, such as TCP/IP, can be used for the communications between tone server 362 and selection server 364 in FIGS. 5-7.

Figure 8:
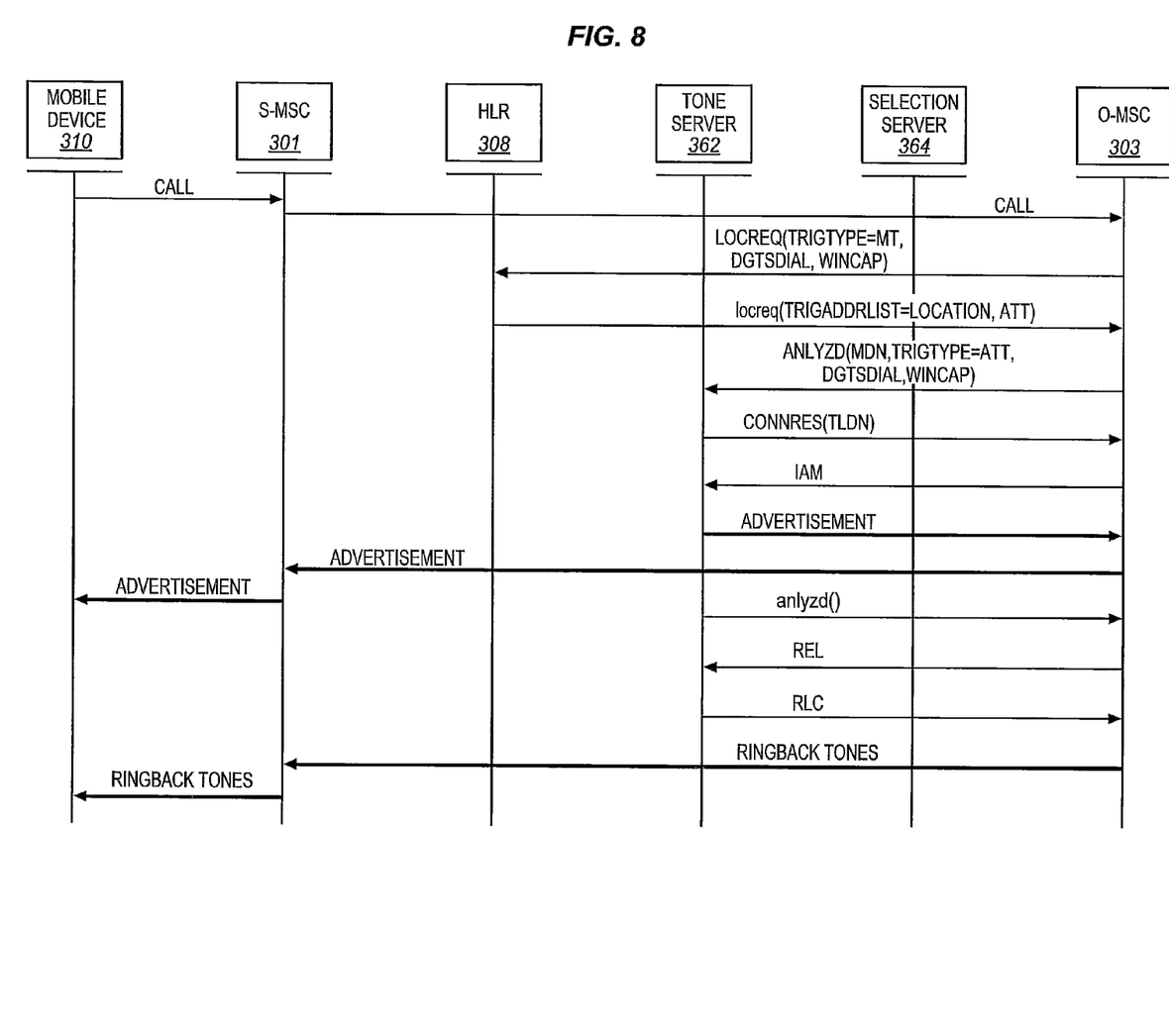
FIG. 8 is a message diagram illustrating another exemplary operation of the communication network of FIG. 3 to provide an advertisement to a calling party in an exemplary embodiment of the invention.

In FIGS. 4-7, S-MSC 301 is the network node that triggers the advertising service. O-MSC 303 may also or alternatively be the network node that triggers the advertising service, which is illustrated in FIG. 8. When the called party subscribes to the service, the network node serving the called party is the trigger. In this case, a calling party will hear an advertisement when placing a call to specific called parties. For instance, if the calling party places a call to a department store, then the calling party will hear an advertisement before ringback tones.

FIG. 8 is a message diagram illustrating an exemplary operation of communication network 300 to provide an advertisement to calling party 312 in an exemplary embodiment of the invention. Calling party 312 places a call through mobile device 310. S-MSC 301 receives the dialed digits for the call and initiates processing of the call. In processing the call, S-MSC 301 routes the call to O-MSC 303, which also initiates termination processing of the call. O-MSC 303 transmits a location request (LOCREQ) message to HLR 308 (which is the HLR for the called party in this embodiment). The LOCREQ message includes call related parameters, such as the dialed digits (DGTSDIAL) for the call, the trigger type, and WIN capabilities. HLR 308 determines that the subscriber desires all terminations to be triggered to an SCP by processing a user profile for called party 322, and responds to O-MSC 303 with a location request response (locreq) message that includes the Trigger Address list containing the list of SCPs to engage, and their associated addresses.

During further processing of the call, as the O-MSC 303 encounters an active trigger (e.g., Advanced Termination trigger), then O-MSC 303 transmits an Analyzed Information (ANLYZD) message to tone server 362. Responsive to encountering the active trigger, O-MSC 303 also suspends call processing on the call and waits for an Analyzed Information response (anlyzd) message from tone server 362 to proceed further with the call processing.

Tone server 362 receives the ANLYZD message from O-MSC 303, and invokes the advertising service using the parameters received in the ANLYZD message. Because calling party 312 has been provisioned in tone server 362 for the advertising service, tone server 362 transmits a request message to selection server 364 requesting details of the advertisement to play for the call (if any). Tone server 362 includes the calling party directory number, MSCID, called party directory number, and other available information in the request message to selection server 364.

Selection server 364 applies its logic to the user profile for calling party 312 to determine whether or not to play an advertisement for the call. If a decision is made to play an advertisement, then selection server 364 also selects an advertisement to play. Selection server 364 may select the advertisement based on different criteria, some of which were described in previous embodiments. After selecting the advertisement to play, selection server 364 transmits a response message to tone server 362. The response message includes an identifier for the selected advertisement.

Responsive to receiving the advertisement identifier, tone server 362 transmits a Connect Resource (CONNRES) message to O-MSC 303. A TLDN parameter of the CONNRES message includes a directory number for tone server 362. Responsive to receiving the CONNRES message, O-MSC 303 transmits an IAM to tone server 362 to establish a (temporary) call leg to the directory number indicated in the TLDN parameter of the CONNRES message. O-MSC 303 thus establishes a temporary call leg to tone server 362 based on the directory number.

With the call leg established, tone server 362 plays the selected advertisement to O-MSC 303 over the bearer channel that has been set up. O-MSC 303 then plays the selected advertisement to S-MSC 301, which provides the advertisement to calling party 312.

Upon completion of the advertisement, tone server 362 transmits an anlyzd message with Null parameters to O-MSC 303. Responsive to the anlyzd message, O-MSC 303 transmits a Release (REL) message to tone server 362 to tear down the (temporary) call leg. Tone server 362 responds with an ISUP Release Complete (RLC) message. O-MSC 303 then resumes processing the call to called party 322 by attempting to connect the call to mobile device 320. O-MSC 303 also transmits ringback tones to mobile device 310 through S-MSC 301. The ringback tones may be traditional ringing tones, multimedia ringback tones, another advertisement, or any other type of ringback.

Though not included herein, a message diagram analogous to FIG. 7 can be drawn showing how selection server 364 of FIG. 8 can skip advertisements for a particular call.

Although specific embodiments were described herein, the scope of the invention is not limited to those specific embodiments. The scope of the invention is defined by the following claims and any equivalents thereof.

We claim:

1. A system comprising:
a network node for serving a calling party;
the network node is configured to receive a call from the calling party to a called party, to interrupt call setup for the call, and to transmit a message to an advertising system requesting delivery of an advertisement to the calling party before ringback tones are provided to the calling party;
the network node is further configured to set an interrupt timer to limit how long call setup is interrupted, and to receive at least one reset request from the advertisement system to reset the interrupt timer if the advertisement plays longer than the interrupt timer;
after the advertising system indicates that the advertisement has been delivered to the calling party, the network node is further configured to resume call setup by routing the call to another network node for serving the called party to provide ringback tones to the calling party and attempt to connect the call to the called party.

2. The system of claim 1 wherein:
the network node for serving the calling party is further configured to process a profile for the calling party that defines triggers for an advertising service, and to interrupt call setup if conditions for the triggers are satisfied.

3. The system of claim 1 wherein:
the network node for serving the calling party is further configured to insert call related parameters in the message to the advertising system for use in selection of the advertisement for the call.

4. The system of claim 1 further comprising:
the advertising system configured to select an advertisement for the call, and to deliver the advertisement to the calling party.

5. The system of claim 4 wherein:
the advertising system is further configured to receive input from the calling party, and to skip the advertisement responsive to the input.

6. The system of claim 4 wherein:
the advertising system is further configured to receive input from the calling party, and to provide additional information for the advertisement to the calling party responsive to the input.

7. The system of claim 4 wherein:
the advertising system is further configured to credit award points to an account for the calling party responsive to delivering the advertisement to the calling party.

8. The system of claim 7 wherein:
the advertising system is further configured to debit award points from the account for the calling party responsive to the calling party skipping the advertisement.

9. A method comprising:
receiving a call from a calling party to a called party into a network node for serving the calling party;
interrupting call setup for the call in the network node;
transmitting a message from the network node to an advertising system requesting delivery of an advertisement to the calling party before ringback tones are provided to the calling party;
setting an interrupt timer to limit how long call setup is interrupted;
receiving at least one reset request from the advertisement system to reset the interrupt timer if the advertisement plays longer than the interrupt timer;
receiving an indication from the advertising system that the advertisement has been delivered to the calling party; and resuming call setup in the network node by routing the call to another network node for serving the called party to provide ringback tones to the calling party and attempt to connect the call to the called party.

10. The method of claim 9 further comprising:
processing a profile for the calling party that defines triggers for an advertising service; and
interrupting call setup if conditions for the triggers are satisfied.

11. The method of claim 9 further comprising:
inserting call related parameters in the message to the advertising system for use in selection of the advertisement for the call.

12. The method of claim 9 further comprising:
selecting an advertisement for the call in the advertising system; and
delivering the advertisement from the advertising system to the calling party.

13. The method of claim 9 further comprising:
receiving input from the calling party into the advertising system; and
skipping the advertisement responsive to the input.

14. The method of claim 9 further comprising:
receiving input from the calling party into the advertising system; and
providing additional information for the advertisement to the calling party responsive to the input.

15. The method of claim 9 further comprising:
crediting award points to an account for the calling party responsive to delivering the advertisement to the calling party.

16. The method of claim 15 further comprising:
debiting award points from the account for the calling party responsive to the calling party skipping the advertisement.

17. A system comprising:
a network node for serving a calling party;
the network node is configured to receive dialed digits for a call from the calling party to a called party, to identify a trigger for an advertising service, to interrupt call setup for the call, and to set an interrupt timer to limit how long call setup is interrupted;
with call setup interrupted, the network node is further configured to transmit a signaling message to an advertising system to establish a temporary call leg with the advertising system so that the advertising system is able to deliver an advertisement to the calling party before ringback tones;
the network node is further configured to receive at least one reset request from the advertisement system to reset the interrupt timer if the advertisement plays longer than the interrupt timer;
the network node is further configured to receive an indication from the advertising system that the advertisement has been delivered to the calling party, to tear down the temporary call leg with the advertising system, and to resume call setup by routing the call to another network node for serving the called party to provide ringback tones to the calling party and attempt to connect the call to the called party.

18. The system of claim 17 wherein:
the network node for serving the calling party is further configured to process a profile for the calling party that defines the trigger for the advertising service, and to interrupt call setup if conditions for the trigger are satisfied.

19. The system of claim 17 further comprising:
the advertising system configured to receive input from the calling party, and to skip the advertisement responsive to the input.

20. The system of claim 17 further comprising:
the advertising system configured to receive input from the calling party, and to provide additional information for the advertisement to the calling party responsive to the input.

* * * * *

UNITED STATES PATENT AND TRADEMARK OFFICE
CERTIFICATE OF CORRECTION

PATENT NO. : 8,385,514 B2
APPLICATION NO. : 11/561769
DATED : February 26, 2013
INVENTOR(S) : Batni et al.

It is certified that error appears in the above-identified patent and that said Letters Patent is hereby corrected as shown below:

In the Specification:

The text in column 4, line 38, "advertising system 106 is slipping" should read -- advertising system 106 is skipping --

The text in column 9, line 32, "Responsive to the LAM" should read -- Responsive to the IAM --

Signed and Sealed this
Eighteenth Day of June, 2013

Teresa Stanek Rea
*Acting Director of the United States Patent and Trademark Office*